(12) United States Patent
Beveridge

(10) Patent No.: US 6,190,150 B1
(45) Date of Patent: Feb. 20, 2001

(54) WINDSHIELD REPAIR INJECTOR

(75) Inventor: Robert A. Beveridge, Coral Springs, FL (US)

(73) Assignee: Quick Fix Windshield Repair, Inc., Ft. Lauderdale, FL (US)

( * ) Notice: Under 35 U.S.C. 154(b), the term of this patent shall be extended for 0 days.

(21) Appl. No.: 09/169,431

(22) Filed: Oct. 9, 1998

(51) Int. Cl.[7] .................................................. B32B 35/00
(52) U.S. Cl. .............................. 425/11; 425/12; 425/13; 156/94
(58) Field of Search .................................. 425/11, 12, 13; 156/94

(56) References Cited

U.S. PATENT DOCUMENTS

| | | | | |
|---|---|---|---|---|
| 3,993,520 | * | 11/1976 | Werner et al. .......................... | 425/13 |
| 4,569,808 | * | 2/1986 | Smali ..................................... | 425/12 |
| 4,954,300 | * | 9/1990 | Dotson .................................... | 425/12 |
| 4,975,037 | * | 12/1990 | Freiheit .................................. | 425/12 |
| 5,122,042 | * | 6/1992 | Einiger ................................... | 425/12 |
| 5,589,018 | * | 12/1996 | Campfield .............................. | 425/12 |
| 5,635,116 | * | 6/1997 | Einiger et al. .......................... | 425/12 |
| 5,670,180 | * | 9/1997 | Mackey et al. ......................... | 425/12 |
| 5,952,012 | * | 9/1999 | Thomas et al. ......................... | 425/12 |

* cited by examiner

Primary Examiner—Harold Pyon
Assistant Examiner—Thukhanh T. Nguyen
(74) Attorney, Agent, or Firm—Malin, Haley & DiMaggio, P.A.

(57) ABSTRACT

A windshield repair injector, to repair star, bulls-eye and elongated cracks in a laminated windshield. The device has a stepped threaded section for easy removal and installation. When the injector is placed against a glass surface, upward motion of a piston provides a vacuum in the piston chamber for removing moisture trapped in the damage region. Afterwards insertion of an optically clear resin, with an optical coefficient equal to glass is inserted under pressure, creating a permanent and virtually invisible repair.

13 Claims, 4 Drawing Sheets

WINDSHIELD REPAIR INJECTOR

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

This application relates to an injector for repairing vehicle windshields by means of application of vacuum for cleaning and de humidifying the damage area, and thereafter implanting a particular type of clear resin which has been developed for this purpose. The injector of the present invention is an essential part of a windshield repair system.

2. Description of Related Art

During the past thirty years, laminated glass has been used as safety glass in windows of automobiles and on all on-the-road vehicles. Laminated glass is commonly constructed of a front and a rear surface glass layer. These glass layers are bonded to an intermediate layer of a tough plastic material. This type of glass-plastic sandwich is designed to remain together during an accident, and is commonly called a safety glass windshield. When these windshields are cracked or damaged as the result of impact by stones or road debris, which may be thrown up from the road during travel, the outer layer of glass is usually damaged. Most often the intermediate plastic and the interior glass layers remain intact.

These damages take many forms, from simple crack lines to "stars", where additional cracks extend radially outward from the point of impact, and include "bulls eyes," where a stone has caused penetration of the outside layer of the windshield glass, without the radial cracks.

Long cracks require a different technique to repair because they cannot be subject to a vacuum therein, but these can be repaired using the present invention, as described in the referenced prior art.

Replacement of a windshields is very costly. The methods described herein were designed to create a permanent repair of the cracked or damaged region, negating the need to replace the entire windshield. Experience has shown that the greater preponderance of damages are on the outside pane of the glass sandwich. The instant invention can be used to repair the interior layer of glass as well as the outer glass layer, as may be required.

The development of clear and permanent flexible hard resins which are resistant to weathering has created an industry which is dedicated to field repair of cracked or damaged vehicle windshields. Dirt and water are removed from the damaged region by the application of a vacuum. A clear resin is then forced, under pressure, into the windshield damaged area. A second vacuum cycle may be required to remove air which has become entrapped in the resin during insertion. Afterwards, the resin is allowed to cure. Curing is accomplished by exposure to ultraviolet radiation. Ultraviolet radiation may be derived from sunlight or from a portable ultraviolet electric light. When the resin has the same refractive index and coefficient of expansion as glass, the repair is virtually invisible. These methods of repair are well known in the art, and are not repeated here. The major problems associated with the existing systems are the need for external hand or electric pumps to provide either pressure or vacuum, and the restricted degree of vacuum which can be obtained by a simple injector piston chamber. These problems are solved by the instant invention.

Many different injector designs have evolved during the past decade. Relevant prior art includes systems using electric or manual pumps to first generate the necessary vacuum for an injector followed by a resin fill of the injector, and the subsequent insertion of a resinous material into the damaged windshield area. In other cases, manually operated syringes are used for the same purpose, the syringe being attached to an injector device by means of a hose or tubing. The syringe provides both the vacuum and the pressure required for the repair.

Older designs have used special one or two part epoxies to repair the windshield. Modern systems embed a clear resin, having a coefficient of expansion and refractive index equal to that of window glass, inserted into the damaged area, resulting in a repair that is virtually invisible.

Prior art includes a WINDSHIELD REPAIR APPARATUS, U.S. Pat. No. 5,122,042 Issued to Einiger on Jun. 16, 1992. Other patents indicated therein are included by reference. Mr. Einiger's patent 5,122,042, describes a resin injector which is supported and held to the glass window by three conventional suction cups. These suction cups are equidistantly located in triangular shaped carrier. The injector mechanism is located at the geometrical center of the equilateral triangle which is formed by the three mounting suction cups. The injector is connected by a flexible tube to a manually operated syringe. In use, the repair apparatus is held to the surface of the window to be repaired by the three aforementioned suction cups. These suction cups are well known to those in the art. The details of operation are shown in the '042 patent A manually operated syringe is used to provide a partial vacuum to the damaged area on the outward stroke of the piston contained therein. Acetone solutions or other desiccating fluids may be used to clean the affected area. Several successive applications of cleaning fluid and vacuum stroke may be necessary to clean the cracked section if dirt has been allowed to accumulate therein. Afterwards, the same syringe is loaded with the resin which will be applied to the crack for repair. The syringe also provides the pressure required to insert the required resinous material into the damaged area, thus effecting the repair.

In the Einiger invention, U.S. Pat. No. 5,122,042, the manually operated pump is held between the palm and the fingers of the hand. The amount of vacuum or pressure is limited by the strength of the hand, and varies from user to user. Other variables which can affect the viscosity of the resin, such as age or temperature, can either contribute to or detract from the integrity of the repair.

U.S. Pat. No. 5,635,116 issued to Einiger on Jun. 3, 1997, describes a method for repairing damages in either the outside or inside glass using conventional crack expanders and resin injectors movably disposed on said cracks.

U.S. Pat. No. 5,670,180, issued to Randy L Mackey and Robert A, Beveridge, LAMINATED GLASS AND WINDSHIELD REPAIR DEVICE, issued Sep. 23, 1997. This patent addresses the variability and limitations of the manual syringe pump seen in the '042 patent. In the Mackey apparatus, U.S. Pat. No. 5,670,180, the syringe is replaced by a compound piston arrangement, driven by a manually rotated Acme thread and removable fixed pin. The Acme thread and the fixed pin cooperate to move the body of the Acme thread, which is integral to the injector piston, when the Acme thread is manually rotated. This kind of actuator provides constant pressure and is not dependent upon the variations in human strength. In this embodiment, a screw mechanism drives a dual piston arrangement. The upper piston having a large diameter, for efficient creation of the required vacuum. A lower section having a smaller diameter piston for pressurizing the resin to be applied to the windshield damaged area.

U.S. Pat. No. 4,954,300, GLASS REPAIR METHOD AND APPARATUS, issued on Sep. 4, 1990 to J. R. Dotson, describes an injector mechanism which must be heated to a temperature ranging between 75 degrees F. To 150 degrees F. in order to operate.

U.S. Pat. No. 3,993,520, WINDSHIELD REPAIR APPARATUS AND METHOD, issued on Nov. 23, 1976, to Werner et al, describes a method for inserting a clear liquid resin into a damaged windshield. Air bubbles are removed by using a vacuum. This 22 year old patent is now in the public domain, and describes the salient features of a windshield repair system.

U.S. Pat. No 5,589,018, GLASS REPAIR KIT AND METHOD OF USE, issued on Dec. 31, 1996 to Richard A. Campbell. This patent describes several different window repair devices, combinations of which may be used to implement a shatterproof window repair. These elements include devices similar to the previous art. These include resin and resin injectors, and support hardware.

BRIEF SUMMARY OF THE INVENTION

The present invention provides an enhancement over the Mackey—Beveridge U.S. Pat. No. 5,670,180. The entire disclosure of the Mackey '180 patent and the Einiger patents '042 and '180 are incorporated herein by reference. In the present invention, the injector mechanism is a single intermediate sized piston which serves both to pull the required vacuum on the damaged area, for cleaning and degassing purposes, and to provide the pressure required for the resin application. The injector body and piston are all manufactured from non-corrosive stainless steel. An Acme thread screw type actuator is used to move the piston up and down in the piston chamber.

The injector of the present invention is mounted on a sturdy metal platform. In order for the injector to be operative, a mounting is required. Such mountings are well known in the art, and are not part of the instant invention.

The injector has been further modified over prior designs, having no threads on the lowermost section. This allows rapid removal and replacement of the injector in the platform. The injector forward end contains a rubber seal which closes the injector nozzle against the glass to be repaired when the injector is in the correct position. The rubber seal may be either a pre-molded form or a simple O-ring. Once positioned on the platform, a manually rotatable jam-nut on the injector body allows the injector to be locked in place, preventing injector rotation while the upper Acme screw, in communication with a removable pin, is rotated clockwise for pressurization of the injector. The removable pin allows the piston to be rapidly withdrawn for pulling the necessary vacuum on the damaged region of the windshield, or for piston removal. The injector is then removed from the platform, collected moisture and dirt is wiped away. The injector cavity is partially filled with the resinous material.

Afterwards, the injector is replaced on the platform and secured in place, with the forward seal firmly seated against the glass surface. The removable smooth pin is then replaced, inserted into the root of the Acme thread, to activate the threaded drive capability of the injector. Clockwise rotation of the upper knob provides the necessary pressure as the piston is forced downward. Counter clockwise rotation from the downward position will create a secondary vacuum within the piston chamber. The secondary vacuum is used when it is necessary to de-gas the resin after insertion into the damaged area of the window. The Acme thread and pin combination provides a continuous degree of adjustment of vacuum or pressure.

The piston chamber is the reservoir for the resin which is required to the perform repair.

In the prior art, external vacuum pumps have been attached to the injector mechanism to evacuate the damaged area prior to the application of the repair resin. These external vacuum pumps also are used to remove collected air from the resin. In other patents, the volume of the piston is inadequate to assure proper vacuum levels when the piston is lifted.

In the present invention, the volume of the piston chamber is maintained at greater than ten times the volume of the largest "Star" or "Bulls-Eye" crack to be repaired by the apparatus described herein. In addition, the piston volume contains enough resin to enable the injector to move along a major crack, and if necessary, effect a repair. No hoses or auxiliary vacuum or pressurizing pumps or heaters are required.

The diameter of the piston may, of course, be increased to more readily develop adequate vacuum when the piston is pulled rearward. Generally, the present 0.443 diameter piston will require approximately six pounds of force to create the optimum vacuum. The force required to pull vacuum on the piston is proportional to the radius of the piston, squared. Doubling the diameter to 0.886 in will increase the force required to 24 pounds. For this reason, many injector designs have a piston which is small, (e,g,) approximately 0.25 inch in diameter. The small piston, however is very vacuum limited, and multiple strokes may be required to degas the applied resin. In general, external vacuum pumps are required when small diameter pistons are used. In the present invention, the diameter of the piston has been increased until a proper vacuum can be created by the piston. In an adaptation, a lever drive means further reduces the manual effort required to operate the injector.

A primary object of this invention is to provide a single injector mechanism which is sized to produce the necessary degree of vacuum required to remove moisture from the damaged area, and then develops the requisite pressure required to then implant a resin with the same coefficient of expansion of refractive index as glass into the damaged area, and finally to provide a vacuum to remove any vestiges of air from the damaged area, allowing the resin to fill and cure into a durable and permanent repair of the windshield. No external vacuum pumps, heating mechanisms or auxiliary devices are required.

Another object of this invention to provide an injector which is simple to use, produce, reliable in its operation, and durable.

Another object of this invention is to provide an injector which is easy to operate and can readily be cleaned of residue which is collected during the vacuum and pressure phases of the operation.

Another object of this invention is to provide an injector which is easy to install and remove.

Another object of this invention is to provide an injector which covers a wide range of damage area, yet requires a small force to operate.

DETAILED DESCRIPTION OF THE INVENTION

Figure 1:
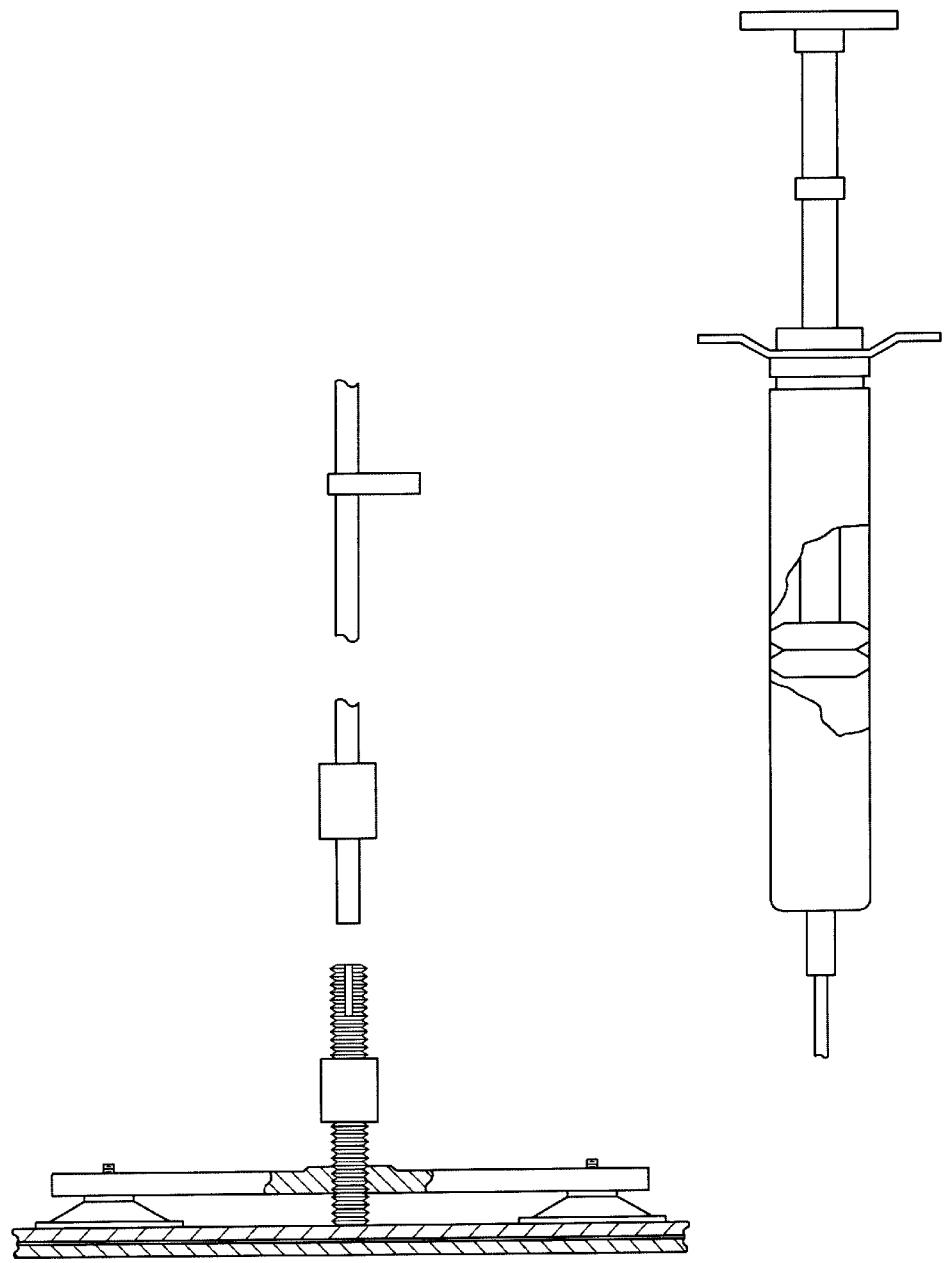
FIG. 1 illustrates a prior art injector system.

Referring to FIG. 1, in this embodiment the supply for vacuum and resin is found in a remote syringe, whereby the syringe is connected to the injector by a flexible hose. The syringe is operated my manually grasping the plunger handle and the support member between the palm and the fingers. This syringe provides a limited vacuum and pressure, which is dependent upon the user's strength.

Figure 2:
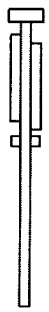
FIG. 2 illustrates a prior art improvement on the vacuum system.
Figure 2:
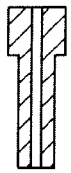
Figure 2:
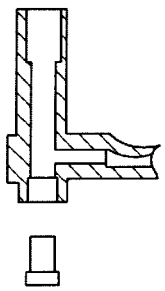
Figure 2:

In reference to FIG. 2, the injector is fitted with a port perpendicular to the body of the injector to which an external vacuum pump is attached. Since the resin cannot be allowed to flow into the exhaust port, the low connection of the vacuum outlet on the injector body only allows a small amount of resin to be installed.

Figure 3:
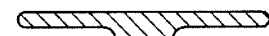
FIG. 3 further illustrates a prior art improvement on the injector technology.
Figure 3:
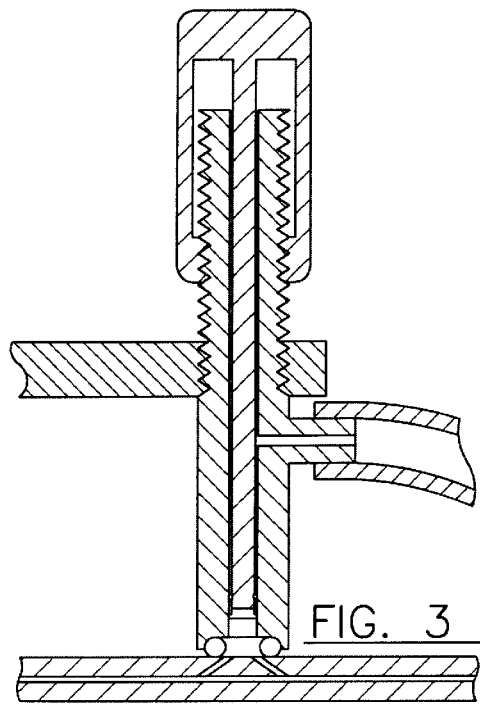

Referring now to FIG. 3, an external vacuum pump is also used to evacuate the injector. In this application, the vacuum port has been relocated partway up the injector body to allow a larger volume of resin to be inserted. When the injector piston is raised above the vacuum port. A vacuum is created. The higher location of the exhaust port reduces the active stroke of the piston assembly, reducing the amount of vacuum that can be created by the piston in its chamber. In this application, Patent No. 4975037, the injector piston is released from its holder and the piston is removed. The interior of the piston chamber can be cleaned of residue. Resin is inserted into the injector body and the injector is put back in place. A screw mechanism enables the operator to then pressurize the resin and force the resin into the damage area of the windshield.

Figure 4:
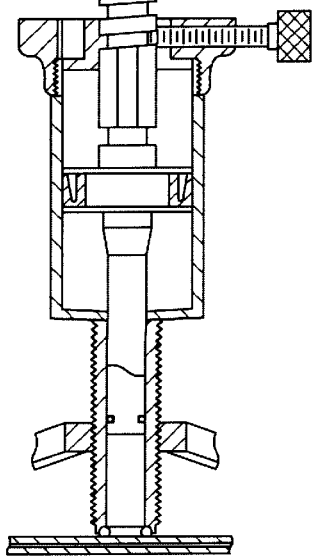
FIG. 4 shows a more recent development of the injector mechanism prior art.

Referring now to FIG. 4, the intent of the invention in FIG. 4 is to eliminate the external vacuum pump. In order to achieve this effect, a dual piston arrangement has been employed. The first piston has a large cross section area, enabling the creation of a good vacuum within the limited stroke of the large piston. A second, smaller piston is used to develop the pressure required to insert the resin into the damaged area of the windshield. The large cross section of the large piston , while effective in creating the requisite vacuum, also demands a large force to move the piston in the chamber. To satisfy this requirement, a screw means is employed to move the piston of the injector up and down. The screw is a square type, known as an Acme Thread. The acme thread is an old design, well known to those in the mechanical arts.

Figure 5:
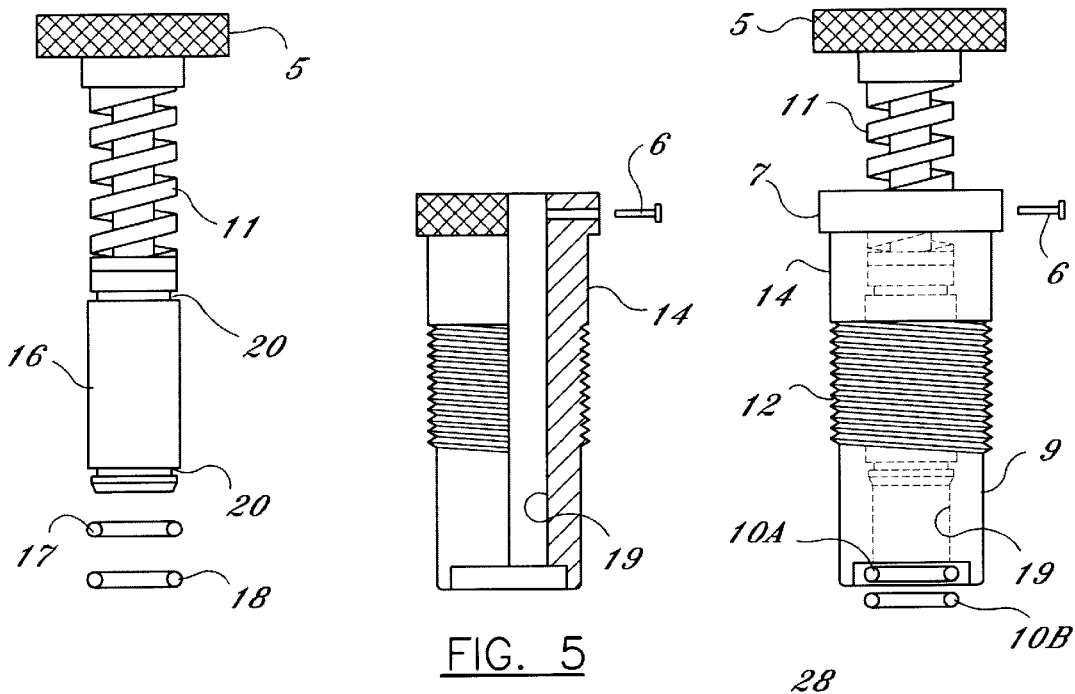
FIG. 5 illustrates the details of the basic injector assembly of the instant invention, and shows how the components fit together.

Further referring to FIG. 5, the piston O-rings, which are not seen in the other views because of their small size are shown here. The dual piston system which is revealed in FIG. 4 has been eliminated. The use of the Acme thread to move the piston has been retained. The piston diameter and stroke have been designed to produce the degree of vacuum and pressure, necessary to produce clean damage areas, and to force the resin into the damage area for the repair.

Figure 6:
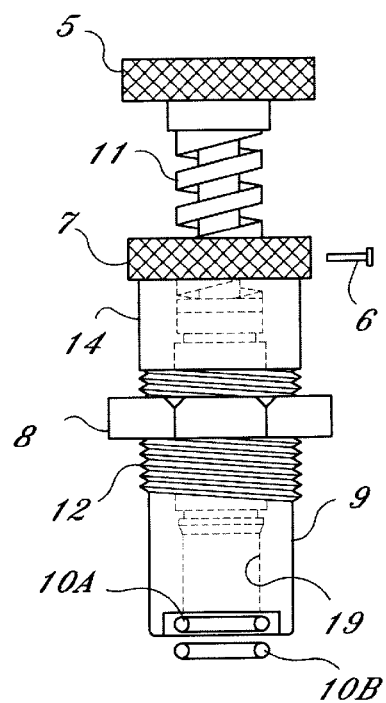
FIG. 6 illustrates a completed injector of the present invention.

In further reference to FIG. 6, a locknut is used to prevent rotation of the injector body when it is installed on a suitable platform.

Figure 7:
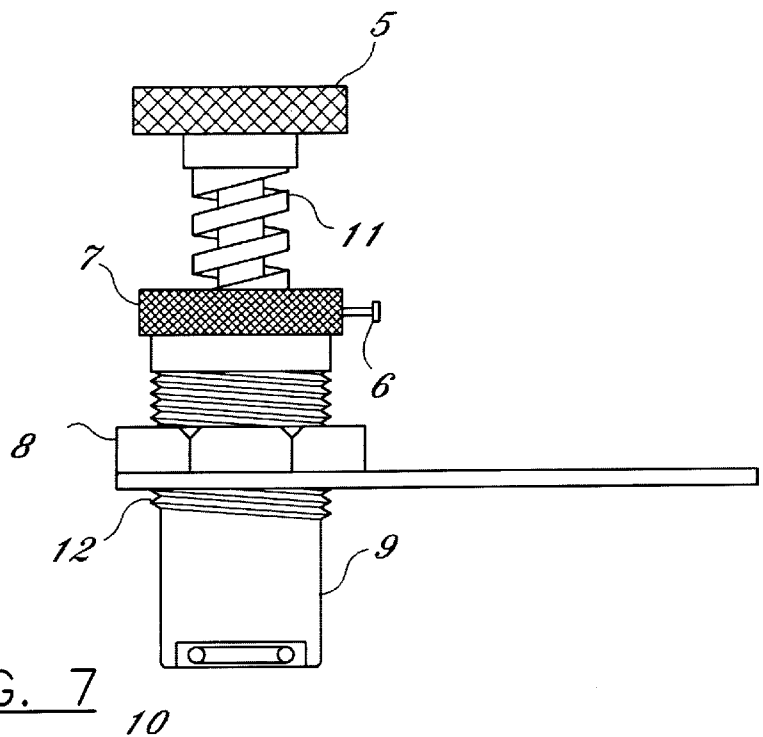
FIG. 7 illustrates the present invention installed on a section of a platform.

Referring now to FIG. 7, although the platform is not part of the invention, a portion is shown for clarity.

Figure 8:
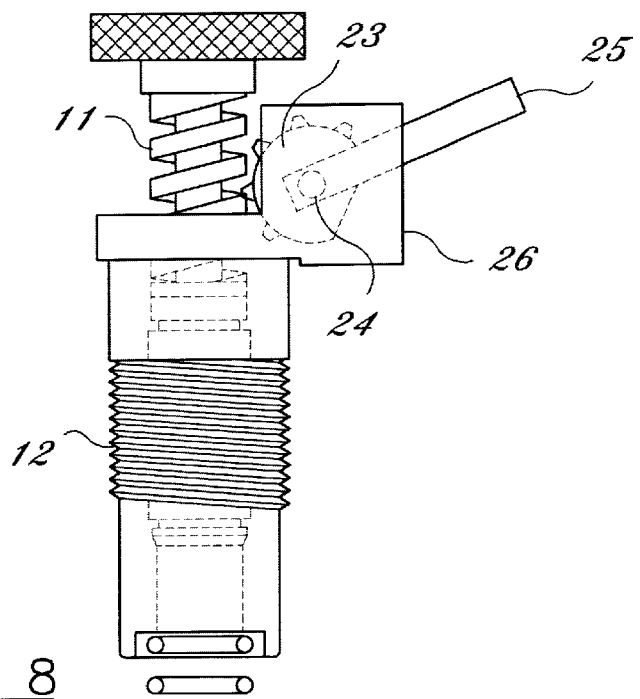
FIG. 8 illustrates the Windshield Repair Injector System of the instant invention, illustrating an alternate basic injector body.

In further reference to FIG. 8, a mating gear, rotatably positioned by a connected lever, is mounted in an integral holder on the injector body, as a means for moving the piston contained within the injector in an up and down motion, for creating a vacuum or for pressurizing the resin. The gear is truncated such that when the lever is in its most clockwise position, contact with the Acme thread of the piston is removed. The piston is now free to be removed for cleaning or for charging the piston chamber with resin. Removal of the piston from the rear allows the resin to be implanted in the actuator without disturbing the front seal. When the piston is manually operated to create a vacuum, the necessary pull is approximately 6 pounds. The lever mechanism described, by its mechanical advantage, reduces the required force to remove the piston while creating a vacuum.

FIG. 5 illustrates the construction details of the stainless steel injector of the instant invention. The injector assembly 28 is composed of several elements. These include:

An injector body 14 having a threaded section 12 on the outer surface. The threads are designed to mate with a threaded opening in the forward end of a platform 1. This platform is not part of the instant invention, but is mentioned here, and a part of the platform is shown in FIG. 7 for the sake of completeness. The platform 1 can be manufactured of stainless steel, or if desired, the platform can be manufactured of aluminum, providing the aluminum has a minimum thickness of 0.188 inch. Prior injector designs have had threads 12 which extend the entire length of the injector body. This long threaded section increases the time necessary to install and remove the injector assembly 28. Removal of the injector assembly is essential for cleaning and charging the injector with the resin. In the instant invention, the length of the threaded section has been reduced to allow rapid installation and removal from the platform 1.

The injector body 14 having a bore therethrough 19 for an internally mounted piston assembly 16. The bore having an interior finished surface of 0.0001 inch RMS amplitude. O-rings 17 and 18 are mounted on the piston 16 in groves 20 provided for that purpose. These 0-rings create a seal between the piston 16 and the injector body bore 19.

A piston 16 having a first or upper end and a second or lower end, with a section near the first end containing thereon a square cut thread 11, as for example, an Acme thread, well known to those in the art, for inducing up and down motion of said piston. Just below the Acme thread, at the upper end of the smooth section of piston 16, a groove 20 is positioned to accept a first O-ring 17. The second end of the piston 16 is smooth, having a groove 20 for installation of a second O-ring 18. The piston length is sized so that when fully inserted into bore of the piston chamber 19, the front surface of the piston 16 rests above the glass surface by 0.1 inch.

When mounted to a rigid platform 1, the injector assembly is movably adjusted so that the lower gasket 10A or 10B is in firm contact with the glass surface of the windshield to be repaired. The injector gasket must extend over and beyond the area to be repaired. The locking ring 8 is then manually tightened against the platform to prevent the injector from moving during adjustments, during vacuum operation, or during the pressurization of the applied resin.

To solve the problem of extended time required to insert and remove the injector assembly, the lower section of the outer surface of the injector assembly 28 has been made in a smaller unthreaded diameter 9. This diameter is smaller than the threaded bore of the platform 1. This modification allows easy insertion and removal of the injector assembly. Only a few threads are required to mount the injector 28 to the platform. This is an important modification, since the injector assembly has to be removed for cleaning and manually filled with the resin. The injector assembly 28 is then replaced into the platform bore and threaded into place. The locknut 8 secures the injector to the platform 1. Pin 6 is replaced until the smooth end engages the root of the Acme thread. Clockwise rotation of the knob 5, moves the piston 16 downward. This motion forces the resin, under pressure, into the damaged area. A seal gasket 10 A or an O-ring 10B, forms a tight seal with the glass enabling the injector to provide reliable vacuum or pressure, as may be required.

A locknut 8, which may be octagonal shaped or round with a knurled edge secures the injector assembly 28 to the platform, preventing rotation of the injector body 28 when the piston 16 is actuated by rotating the integrally fixed knob 5 in a clock-wise or counter-clockwise direction.

An important feature of this invention is the ratio of the piston chamber volume to the volume of the damaged region of the glass. Physics has shown that when the piston is retracted, the volume of the piston chamber must be at least ten times greater than the volume of the portion to be repaired, in order to create a sufficient vacuum to withdraw moisture which has become entrapped in the damaged area. Generally, the injector casing has a bore therethrough with a diameter of 0.445 inch. The volume of the chamber when the piston is moved upward with a 1 inch travel is 0.445 cubic inches, or 2.28 cubic centimeters. By way of example only, the volume of the conically shaped damaged area, on a 0.125 inch window pane, (Assuming the damage penetrates to the plastic layer) varies with the diameter of the damage. Conical Volume=(D×H)/3. Where D is the diameter of the damaged surface, and H is the glass thickness, H equals the depth of the damage. (Typified as 0.125 in.) In certain types of damage, the conical shape is inverted, with the larger diameter against the plastic material. This leaves a smaller opening to be covered by the injector. The defining equations still are valid. For D=0.125, the volume is 0.0052 cubic inches. For D=0.25 inch, the volume of the damaged area is equal to 0.0104 Cubic inches For a 0.125 inch damage, the ratio is 0.445/0.0052=85.57:1 For a 0.25 inch damage, the ratio is 0.445/0.0104=42.78:1 When thick glass is used in the windshield, and the thickness is ¼ inch, a crack may have a larger conical diameter. For D=0.25, Volume= 0.01 the ratio is 44.3:1. For a damage diameter of ⅜ of an inch, the damage volume is 0.0312,. The ratio is 14.91.

In accordance with Boyles law, if the temperature is held constant, $P_1 \times V_1$ equals $P_2 \times V_2$ where P=Pressure and V=Volume. If no air can be introduced, increasing the volume of the piston chamber by a factor of ten decreases the pressure therein by the same factor, or from 14.7 pounds per square inch, to 1.47 pounds per square inch, from 30 inches of mercury to 3 inches of mercury. Note that a full one inch stroke with a 0.25 inch damage in a 0.125 thick window will create a vacuum with a ratio of 42.78 to one. The resulting pressure in the chamber will be 14.7/42.78, or 0.344 psi. This low pressure will cause the entrapped vapors (usually water vapor) to leave the damaged area. The ratio of the piston volume to the volume of the damage in the glass, is retained at greater than ten, assuring that in the vacuum mode, the suction on the damaged volume is more than sufficient to remove the vestiges of fluid which may be in the cracked region.

Water is always present in the damaged area if the vehicle is not repaired immediately after the incident which damaged the window occurs. The vehicle is invariably rained upon. It is this moisture which must be removed from the damaged region. Failure to remove the moisture can make the repair weak or visible.

The injector diameter has been sized to cover the range of damages usually encountered in windshields which have been struck by road objects, usually small stones. The range of damage diameter for the present invention is 0.188 inch to 0.4 inch. If necessary, this injector design can be manufactured to have piston diameters in the range of 0.4 inch to a maximum of one inch. For larger diameter injectors, a larger piston diameter will be required. The larger diameter piston, however, will require a greater force to move the piston to create a vacuum therein. In the present invention, pin 6 plays an important role. This pin is partially threaded along the length of the body. The forward section, approximately ¼ inch in length, is cylindrical and smooth, devoid of any threads. When the pin is in its rearmost position, the piston 16, may be readily removed by hand.

Pulling the piston 16 out of the injector body, when the injector forward end is sealed against the glass surface, causes a vacuum to be formed for cleaning the cracked region or degassing the resin. Multiple vacuum cycles may be necessary to remove all of the fluid or debris in the cracked region. After the vacuum cycle is completed, the piston is removed and both the piston surface and the injector bore must be wiped clean of accumulated moisture or dirt.

The piston 16 is re-installed in the injector bore and left in its rearmost position. The injector assembly is removed from the platform by loosening the locknut 8, and unscrewing the injector assembly from the platform. The sealing resin is put into the piston chamber from the front-most and open end of the piston chamber. The injector is repositioned with the gasket 10 firmly contacting the glass surface. Locknut 8 is rotated to secure the injector 14 in position on the platform. The set screw 6 is then rotated clockwise until the smooth forward unthreaded section engages the Acme thread between the threads. This engagement locks the piston in position. Rotating the upper knob 5, clockwise causes the piston to move downward, applying pressure to the enclosed resin, forcing the resin into the damaged area of the window. FIG. 8 shows a further implementation of the instant invention. Pin 6 is not required. In this embodiment, the injector is fabricated with a body extension 26 into which a gear 23 is rotatably mounted. The gear has a flat region as well as teeth. The gear engages the piston Acme thread 11, and when lever 25 is rotated counter-clockwise, the piston is forced downward. This is the pressure mode. Rotating lever 25 clockwise from the downward position causes a vacuum cycle to be initiated. Continued clockwise rotation of the lever, until the aforementioned flat faces the acme thread. Thus the Acme thread is not engaged at this position, enabling the piston to be removed, leaving the first end of the cylinder bore 19 open. The bore may be then cleaned as may be required, and resin may be added.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A windshield repair injector comprising:

a cylindrical injector body extending from a first end to a second end said cylindrical injector body having therethrough a cylindrical bore which extends from said first end to said second end of said cylindrical injector body, said bore having an interior wall dimensioned and finished for accepting therein a rotatably or vertically movable cylindrical piston, said piston having a first end and a second end said first end containing thereon an actuator threaded section and an outer knob, said knob positioned above, and affixed to said actuator threaded section, said knob installed for allowing an operator to rotate said piston when said piston is located within said bore and a fixed pin is installed between the threads of said actuator threaded section, said piston further having grooves thereon for installation of a plurality of O-rings, said O-rings sized to produce a seal between said bore wall and said piston body, wherein said actuator threaded section on said piston, when rotated, communicate with said fixed pin, forcing said piston to travel in a direction towards the first end of said cylindrical body when said piston is rotated counter-clockwise, and to travel in a direction towards the second end of said cylindrical body when said piston is rotated clockwise, said cylindrical body second end further having a counterbore for accepting a gasket or an O-ring therein, for creating a seal between said injector body and said windshield, said cylindrical body further having an other threaded section thereon for mounting said cylindrical injector body on a platform designed for mounting said injector, said platform having a means for securing said platform and said injector to said windshield to be repaired;

wherein the vertical motion of said piston occurs when said piston body is rotated clockwise or counterclockwise;

wherein said pin is removed and replaced by a lever operated gear and mounting housing for producing motion of said piston when a lever attached to said gear is rotated.

2. The windshield repair injector of claim 1 further comprising a non-threaded outer exterior surface section between said outer threads and said second end of said cylindrical body, an outer diameter of said body outer exterior section being smaller in diameter than an outer diameter of said outer threads, said smaller diameter providing for insertion and removal of said cylinder from a platform.

3. The windshield repair injector of claim 1 further having a locknut which, when mounted on said cylindrical body outer threads, in proximity to and contacting an upper surface of said platform, locks said injector body from rotating when actuated.

4. The windshield repair injector of claim 1 wherein said cylindrical body having an inside diameter sized to accommodate the range of windshield impact damages, said inside diameter of said cylindrical body having a range of 0.375 to 1.0 inch.

5. The windshield repair injector of claim 1 wherein said piston with O-rings mounted in said grooves providing intimate contact between said cylindrical bore and said piston body, preventing the escape of gas or liquids between said piston and said bore.

6. The windshield repair injector of claim 1 further having an active piston stroke of a minimum of 1 inch.

7. The windshield repair injector of claim 1 wherein said piston having an actuator, wherein said cylindrical body having a certain length such that when said piston and actuator are totally inserted into said cylindrical body, said piston second end maintains a clearance of 0.1 inch between said piston second end and said outer body second end.

8. The windshield repair injector of claim 1, wherein said gear is provided with a flat spot, having no teeth thereon, said flat spot positioned such that when said piston is at the apex of its outward or uppermost position, there is no engagement between said gear and said piston actuator thread, said piston may be removed from said cylindrical body for purposes of cleaning or loading with a resinous compound.

9. The windshield repair injector of claim 1 wherein said platform is secured to a windshield to be repaired by evacuating a vacuum chamber with a self-contained vacuum pump.

10. The windshield repair injector of claim 1 wherein the position of said plurality of similar sized O-rings on said piston and in communication with said uniform sized cylindrical bore permits said injector to be used on vertically disposed glass and in an inverted position.

11. The windshield repair injector of claim 1 wherein said cylindrical bore having a smooth surface.

12. The windshield repair injector of claim 11 wherein the surface of said cylindrical bore is threadless.

13. The windshield repair injector of claim 1 wherein said plurality of O-rings are disposed at opposite ends of a non-threaded portion of said piston.

* * * * *